July 27, 1937.  A. B. WERDEHOFF  2,088,453
AUTOMOBILE FRAME
Filed Dec. 19, 1932
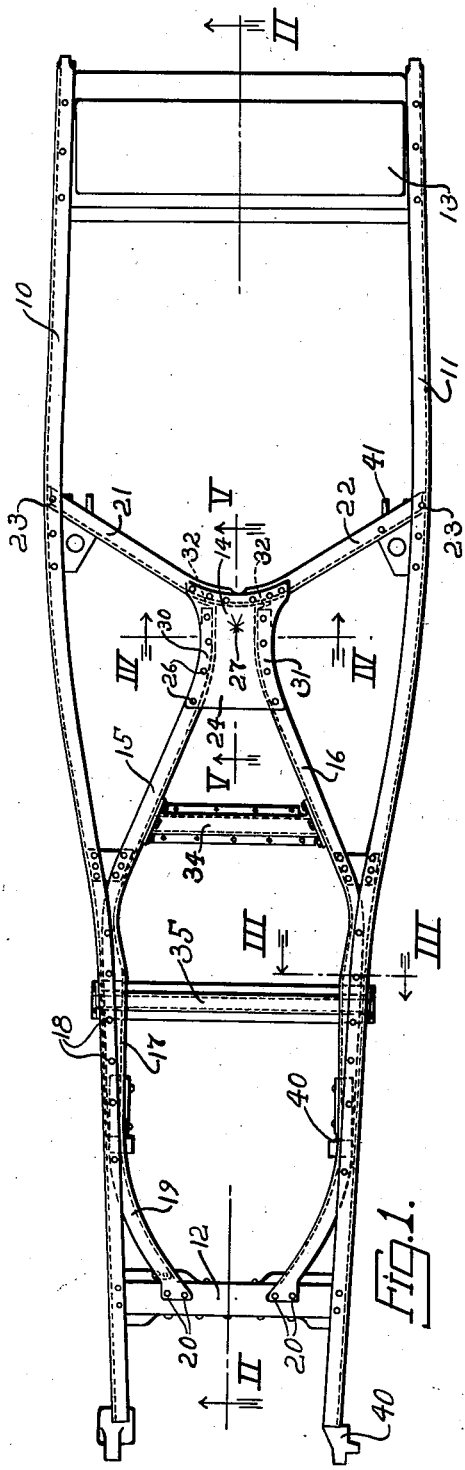
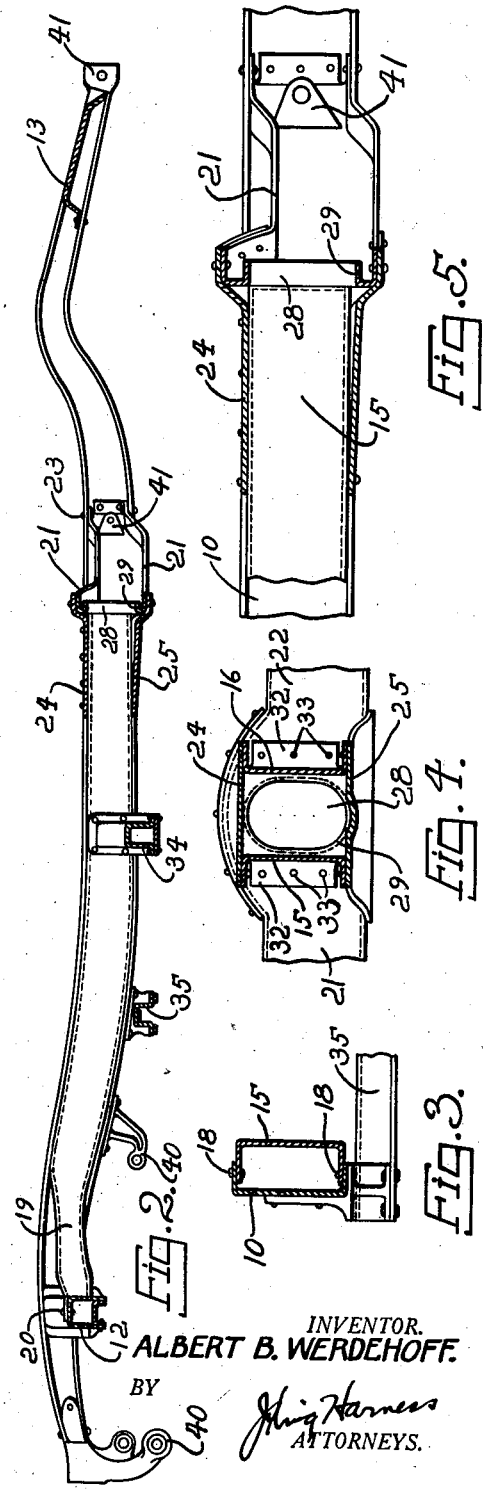
INVENTOR.
ALBERT B. WERDEHOFF.
BY
ATTORNEYS.

Patented July 27, 1937

2,088,453

UNITED STATES PATENT OFFICE 2,088,453

AUTOMOBILE FRAME

Albert B. Werdehoff, Lake Orion, Mich., assignor to Chrysler Corporation, Detroit, Mich., a corporation of Delaware Application December 19, 1932, Serial No. 647,871

4 Claims. (Cl. 280—106)

My invention relates to automotive vehicles and it has particular relation to a novel type of chassis frame for use in such vehicles.

Heretofore, it has been customary, in the manufacture of automotive vehicles, to rigidly bolt the engine to the side rails of the chassis frame, which serves to stiffen the frame as the engine block extends a considerable distance along each side rail and is secured thereto at several spaced points. As a result, any force exerted on one side rail of the frame is transmitted to the very rigid engine block and thence to the other side rail, both of which aid in resisting distortion of the frame.

Recently it has been found desirable to omit the rigid connection between the engine block and side rails and to permit movement of the engine with respect to the side rails, in order to eliminate transmission of noises and unbalanced forces from the engine to the body of the vehicle through the frame. Although this purpose has been successfully accomplished, the elimination of the rigid connection between the engine block and side rail has rendered the frame more flexible and less able to withstand the additional strains to which it has been subjected by the ever increasing speeds of modern driving.

The problem of stiffening the frame is rendered difficult because of the fact that the engine must be disposed between the side rails, which prevents the use of cross braces over a considerable length of the frame, and because the weight of the frame must be kept as small as possible consistent with safety, because unnecessary weight is a dead load on the car and increases its cost.

By my invention I have eliminated these several difficulties by providing a cross brace in the general form of an X immediately to the rear of the engine, by extending the forwardly extending arms thereof along the channel shape side rails and securing them to the flanges thereof to form a rigid box section beside the engine to lend additional strength thereto, and by securing the ends of the arms rigidly to a tubular front brace. In this construction any distorting forces imposed on any portion of the frame is transmitted to and resisted by all portions of the frame, thus lending to the frame a materially increased degree of rigidity with a very small increase in weight, or permitting a decrease in weight with the same or a greater degree of stiffness.

One object of my invention consists in providing a novel type of chassis frame for use in automotive vehicles which is sturdier and more rigid, for a given weight, than those heretofore employed.

An additional object is to provide a novel type of frame which is particularly adapted to resist deflection in a vertical direction at those points at which the running gear and power plant are secured thereto.

A further object is to provide a novel type of chassis frame particularly adapted for use in an automotive vehicle in which the engine is not rigidly secured to the chassis frame.

For a better understanding of my invention, reference may now be had to the accompanying drawing, in which:

Fig. 1 is a plan view of an automobile frame constructed in accordance with my invention.

Fig. 2 is a view, partially in side elevation and partially in section, of the structure illustrated in Fig. 1, the section being taken along the line II—II thereof.

Fig. 3 is a cross-sectional view of a portion of the side rail employed in Fig. 1, the section being taken along the line III—III thereof.

Fig. 4 is a cross-sectional view of a portion of the X-brace illustrated in Fig. 1, the section being taken along the line IV—IV thereof.

Fig. 5 is a cross-sectional view of a portion of the X-brace, the view being taken at right angles to that shown in Fig. 4, and along the line V—V of Fig. 1.

The frame comprises two side rails 10 and 11, each of channel shape cross-section. These side rails are secured together at the front end by means of a transversely disposed tubular brace 12 of hollow substantially rectangular cross-section which is riveted, or otherwise secured, at its ends to the side rails 10 and 11. The rails 10 and 11 are connected together at the rear end of the frame by means of a transversely extending brace 13, of substantially U-shape. Intermediate the ends of the members 11 and 12 is disposed a bracing frame 14 which is generally referred to as an X-frame. This X-frame has two forwardly diverging arms 15 and 16, each of channel shape cross-section. Each of these arms engages one of the side rails and extends forwardly therewith in substantially parallel relationship, as shown at 17. The portion of the arms 17 is of slightly smaller width than the side rails so that the flanges of the arms 15 and 16 fit snugly within the flanges of the side rails 10 or 11, as the case may be, as best illustrated in Fig. 3. These interfitting flanges are secured together by means of rivets 18, or other suitable means, thus forming a portion of the side rail into a hollow rectangular or box beam. The front ends 19 of the arms 15 and 16 curve inwardly away from the side rails 10 and 11 and are secured to the front transverse brace 12 at points spaced from the side rails by means of rivets 20 or other suitable securing means.

The transverse brace 14 also includes two rearwardly diverging arms 21 and 22, the outer ends of which are secured to the side rails 10 and 11 by means of rivets 23, or other suitable securing means. The inner ends of the arms 21 and 22 may be secured together or, as shown, the flanges thereof may be integral. The adjacent portions of the arms 15, 16, 21 and 22 are secured together by means of plates 24 and 25, the plate 24 being secured to the top flanges of the four arms by means of rivets 26 or other suitable securing means, and the plate 25 being similarly secured to the bottom flanges of the four arms. The arms 15, 16, 21 and 22 are so disposed with respect to each other that the planes of their webs intersect at a point 27 which is midway between the two side rails 10 and 11. The webs of the arms 21 and 22 are cut away at their point of union so as to provide an elliptical opening 28, as best illustrated in Fig. 4. The edge of the metal around this opening is flanged, as indicated at 29, to lend additional strength thereto. The purpose of the opening 28 is to permit passage therethrough of the engine propeller shaft (not shown).

The inner or adjacent ends of the arms 15 and 16 are bent into substantially parallel relationship, as indicated at 30 and 31, to permit passage therebetween of the engine propeller shaft (not shown), and the web portions thereof extend slightly beyond the flanges thereof, as shown at 32, and are bent into parallelism with and secured to the web portions of the arms 21 and 22 by means of rivets 33, or other suitable securing means. The arms 15 and 16 are secured together by means of a U-shape transversely disposed brace 35 which is riveted, or otherwise bolted thereto. These two braces 34 and 35, in conjunction with the front brace 12, serve to support and position an engine (not shown) to be mounted thereon.

In addition, the frame is provided with the usual front spring mountings 40 and rear spring mountings 41.

The body of the car (not shown) is rigidly secured to the frame, as is customary. The body extends over the rear part of the frame and extends forwardly approximately to the points where the front arms of the X-member engage the side rails, thus lending rigidity to this portion of the frame. At the point where the body ends, the front arms of the X-member engage and are rigidly secured to the flanges of the side rails, transforming them into rigid tubular beams. This construction not only adds rigidity to the side rails where the stiffening support of the body ceases but also enables the rigid rear portion of the frame to aid the front portion in withstanding forces which tend to distort it.

It will be apparent from this description that this construction adds materially to the rigidity of the frame by employing a box section of side rail at those points where space is very limited and by rigidly tying those box sections to the tubular front brace and to both sides of the body stiffened rear portion by means of angularly arranged bracing members. This arrangement of parts provides a material increase in the stiffness of the frame with a minimum increase in the weight thereof, or permits of securing the same degree of rigidity with a frame composed of lighter weight parts than could heretofore be employed.

Although I have illustrated but a single form of my invention and have described in detail but a single application thereof, it will be apparent to those skilled in the art that my invention is not so limited but that various minor modifications and changes may be effected therein without departing from the spirit of my invention or from the scope of the appended claims.

What I claim is:

1. A vehicle frame comprising two spaced side rails, a frame interconnecting said side rails comprising a front brace structure having two forwardly disposed arms of channel shape cross-section secured to said side rails at corresponding points and converging rearwardly and a rear brace structure having two rearwardly disposed arms of channel shape cross-section secured to said side rails at corresponding points and converging forwardly, said four arms being so disposed that the planes of the webs thereof intersect at a point midway between said side rails, and means securing the adjacent portions of said four arms together, said rearwardly disposed arms being provided with a flanged web-opening midway between the side rails to permit passage of a propeller shaft therethrough, the converged end portions of said forwardly disposed arms having their webs separated from each other in a direction transversely of said side rails for accommodating passage of the propeller shaft therebetween.

2. A chassis frame for motor vehicles comprising a pair of side sills, an X-brace structure connecting said sills intermediate the length of the frame and comprising front and rear brace structures, said front brace structure having a pair of oblique flanged arms respectively connected at outer portions thereof to said sills and having the webs of their inner ends separated from each other to accommodate a propeller shaft, said rear brace structure having a pair of oblique flanged arms respectively connected at outer portions thereof to said sills and having inner portions disposed across the separated ends of the first said oblique arms, said inner portions of the second said oblique arms being formed with a web-opening for accommodating said propeller shaft.

3. A chassis frame for motor vehicles comprising a pair of side sills, an X-brace structure connecting said sills intermediate the length of the frame and comprising front and rear brace structures, said front brace structure having a pair of oblique flanged arms respectively connected at outer portions thereof to said sills and having the webs of their inner ends separated from each other to accommodate a propeller shaft, said rear brace structure having a pair of oblique flanged arms respectively connected at outer portions thereof to said sills and having inner portions disposed across the separated ends of the first said oblique arms, said inner portions of the second said oblique arms being formed with a web-opening for accommodating said propeller shaft, and a plate overlying and rigidly connected to the flanges of said separated inner ends and to the flanges of said inner end portions.

4. A chassis frame for motor vehicles comprising a pair of side sills, an X-brace structure connecting said sills intermediate the length of the frame and comprising front and rear brace structures, said front brace structure having a pair of oblique flanged arms respectively connected at outer portions thereof to said sills and having the webs of their inner ends separated from each other to accommodate a propeller shaft, said rear brace structure having a pair of oblique flanged arms respectively connected at outer portions thereof to said sills and having inner portions disposed across the separated ends of the first said oblique arms, said inner portions of the second said oblique arms being formed with a web-opening for accommodating said propeller shaft, and a plate overlying and rigidly connected to the flanges of said separated inner ends and to the flanges of said inner end portions, the first of said pairs of oblique arms having terminal webs respectively deflected outwardly toward said sills in the direction of the second said pair of oblique arms and connected to the latter.

ALBERT B. WERDEHOFF.